July 2, 1957 G. R. THOMAS 2,797,732
FOLDABLE SEAT FOR AUTOMOBILE BODY
Filed Jan. 4, 1954 4 Sheets-Sheet 1

INVENTOR.
Gerald R. Thomas.
BY
Elmer Jamison Gray
ATTORNEY.

INVENTOR.
Gerald R. Thomas
BY
Elmer Jamison Gray
ATTORNEY.

July 2, 1957　　　　　G. R. THOMAS　　　　　2,797,732
FOLDABLE SEAT FOR AUTOMOBILE BODY
Filed Jan. 4, 1954　　　　　　　　　　　　　　4 Sheets-Sheet 3

INVENTOR.
Gerald R. Thomas
BY
Elmer Jamison Gray
ATTORNEY.

July 2, 1957 G. R. THOMAS 2,797,732
FOLDABLE SEAT FOR AUTOMOBILE BODY
Filed Jan. 4, 1954 4 Sheets-Sheet 4
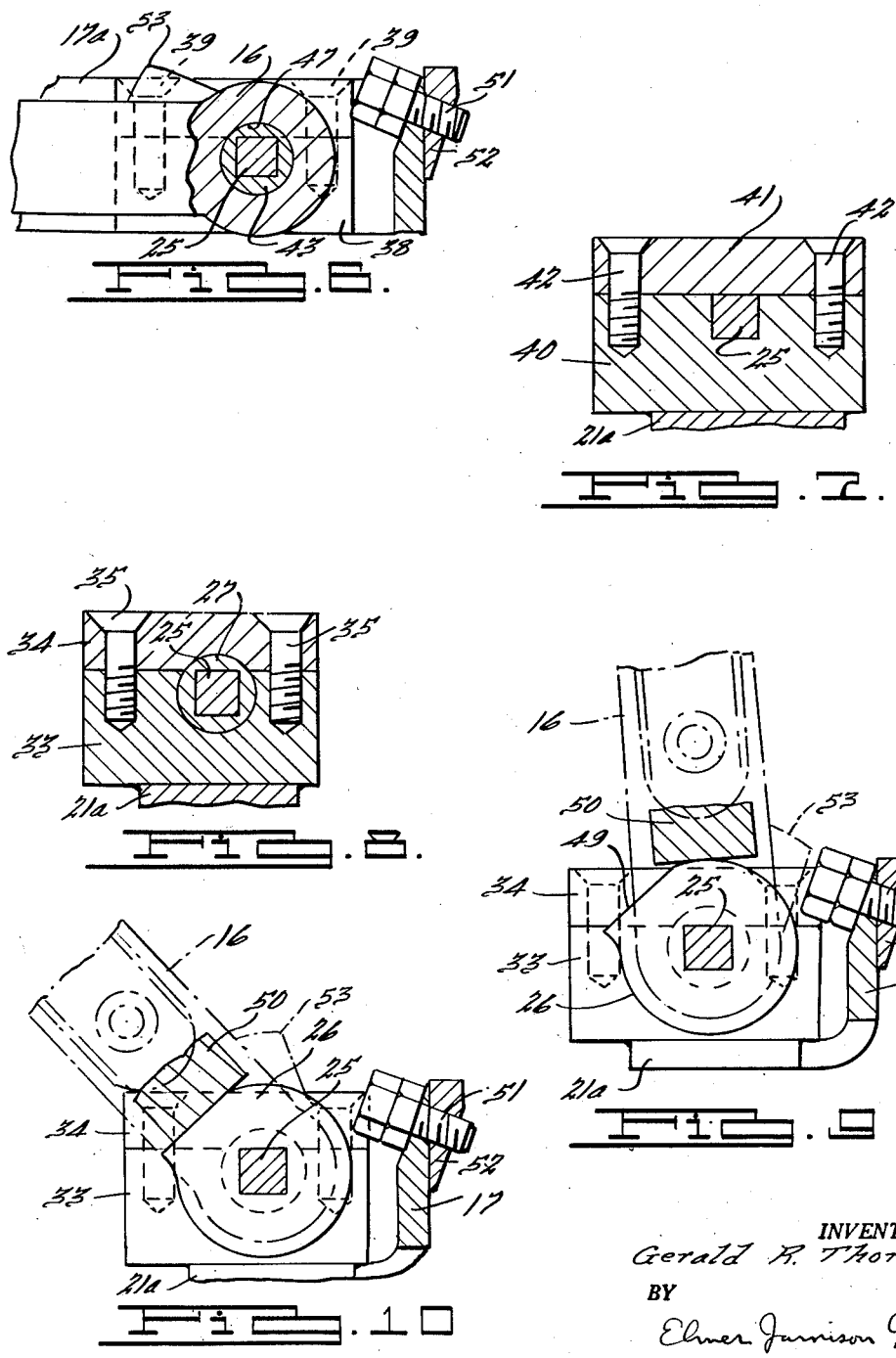
INVENTOR.
Gerald R. Thomas.
BY
Elmer Jamison Gray
ATTORNEY.

United States Patent Office 2,797,732
Patented July 2, 1957

2,797,732

FOLDABLE SEAT FOR AUTOMOBILE BODY

Gerald R. Thomas, Detroit, Mich., assignor, by mesne assignments, to Chrysler Corporation, a corporation of Delaware Application January 4, 1954, Serial No. 401,998

8 Claims. (Cl. 155—13)

This invention relates to a folding auxiliary seat structure of the type employed in a 7-passenger vehicle body for example intermediate the customary front and rear seats.

An object of the present invention is to provide an improved auxiliary seat structure having legs pivotally mounted on the vehicle body at their lower ends and adapted to swing forwardly to a folded position, whereat the auxiliary seat nests within a recess in the back of the front seat.

Another and more specific object is to provide a foldable auxiliary seat having the upper or swinging ends of its legs secured to its forward edge, the lower ends of its legs being pivotally mounted on a horizontal torsion rod extending transversely of the vehicle body, one end of the rod being fixed with respect to the body and the other end being pivotally supported by the body for torsional movement. Keyed on the torsion rod adjacent the pivotal end thereof is a cam or driven element adapted to be engaged by a pawl or driving element on one of the legs when the latter are swung forwardly from an upright unfolded position to a predetermined partially folded position. Thus upon continued swinging of the legs from said predetermined position to the folded position, the cam is rotated by its engagement with the pawl and the pivotal end of the torsion rod is pivoted to effect a counterbalancing action for the seat structure.

When the seat structure is at the unfolded condition, its center of gravity is located rearwardly of the hinge axis of the legs. Suitable movement limiting means are provided to prevent backward swinging of the legs. However when the latter are swung forwardly to said predetermined partially folded position, the center of gravity is swung forwardly of the hinge axis. Accordingly the weight of the seat structure will then urge the legs downward and forward to the folded position. Also at this position, the pawl will engage the cam, tending to twist the torsion rod and effect the counterbalancing action. As the legs continue to swing forwardly to the folded condition, the effectiveness of the weight of the seat structure urging downward swinging increases. Likewise the counterbalancing tension in the torsion rod increases as the latter is twisted by virtue of the engagement between the cam and pawl.

Another object is to provide an improved hinge structure and counterbalancing means for an auxiliary seat of the foregoing character which is particularly simple and compact in construction and efficient in operation.

Other objects of this invention will appear in the following description and appended claims, reference being had to the accompanying drawings forming a part of this specification wherein like reference characters designate corresponding parts in the several views.

Fig. 6 is a fragmentary sectional view through the pivot mounting of the auxiliary seat leg adjacent the fixed end of the torsion bar, taken in the direction of the arrows substantially along the broken line 6—6 of Fig. 2.

Fig. 7 is a fragmentary cross-sectional view through a retaining yoke for the torsion bar adjacent the fixed end thereof, taken in the direction of the arrows substantially along the line 7—7 of Fig. 2.

Fig. 8 is a fragmentary cross-sectional view through a pivotal support for the torsion rod adjacent the latter's pivotal end, taken in the direction of the arrows substantially along the line 8—8 of Fig. 2.

Fig. 9 is a fragmentary sectional view taken in the direction of the arrows substantially along the broken line 9—9 of Fig. 2, showing the auxiliary seat legs in the raised or unfolded position in phantom and showing the torsion bar in the unstressed condition.

Fig. 10 is a view similar to Fig. 9, showing the seat legs in partially folded condition at the commencement of the counterbalancing action.

Figure 1:
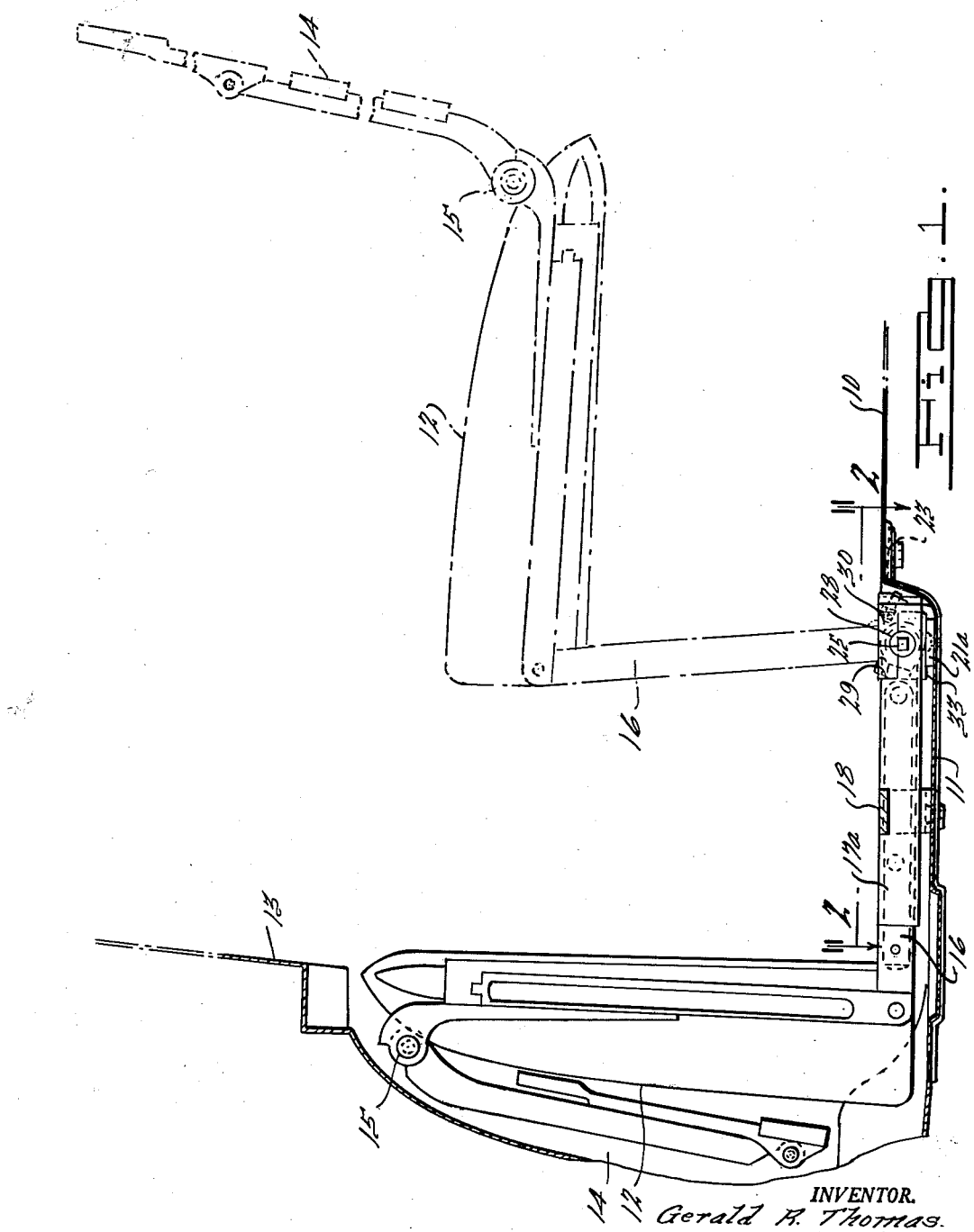
Fig. 1 is a fragmentary vertical sectional view taken along a line longitudinally of an automobile body, showing in side elevation an auxiliary seat structure in folded condition embodying the present invention, the seat structure being shown in upright or unfolded condition in phantom.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, an embodiment of the present invention is illustrated by way of example in application with a 7-passenger type vehicle body having a pair of auxiliary seats 12 adapted to fold forwardly into a recess at the rear of the front seat 13. Ordinarily a pair of such seats are employed spaced side by side. Inasmuch as the auxiliary seat structure and pivotal mounting therefor is the same at each side of the vehicle body, only one auxiliary seat structure is illustrated herein.

In Fig. 1, the rear floor pan 10 of the vehicle body intermediate the customary front and rear seats is provided with a depressed portion 11 at each side of the vehicle center line to afford additional foot room for the occupant of the auxiliary seat. Each seat 12 is provided with a back 14 hinged at 15 and a pair of transversely spaced legs 16 rigidly secured at their upper or swinging ends to the seat 12 and pivotally supported at their lower ends as described below to swing forwardly into lateral portions of the depression 11 and also to swing the seat 12 into a recess within the back portion of the front seat 13 when the back 14 is folded forwardly against the seat 12, Fig. 1.

The mounting for the auxiliary seat structure includes a rigid horizontal U-bracket 17 having a rear portion within and adjacent the rear of the depression 11 and having forwardly extending arms 17a within and adjacent the opposite lateral portions of the depression 11. The upper surface of the bracket 17 lies substantially flush with the undepressed portion of the floor pan 10. Overlying each arm 17a and welded thereto is a supporting bracket 18 having outer and inner portions suitably secured to the floor pan by screws 19. The inner portion of each bracket 18 rests on the pan 10 within the depression 11. The outer portion of each bracket 18 extends through an upper notch in the bracket arm 17a into the floor pan 10 so as to lie flush with the upper surfaces of these members.

Figure 5:
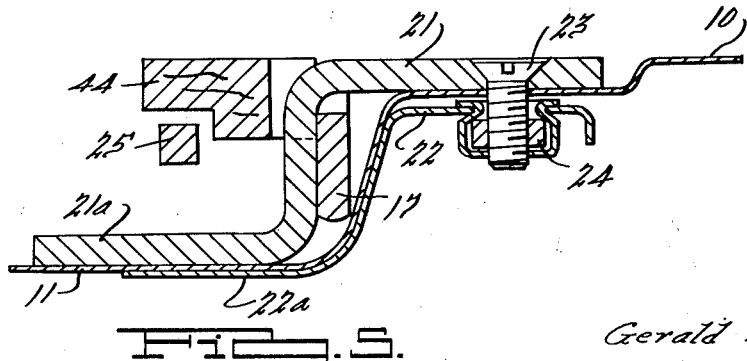
Fig. 5 is a fragmentary cross-sectional view through a pivot support bracket, taken in the direction of the arrows substantially along the line 5—5 of Fig. 2.

At the rear of the depression 11 adjacent its corners are a pair of rigid brackets 21. As indicated in Fig. 5, rearwardly directed upper portion of each bracket 21 is recessed within the floor pan 10 rearwardly of the depression 11 and is secured thereto and to an underlying bracket 22 by a screw 23 and floating nut 24. Thus the upper portion of the bracket 21 lies flush with the pan 10 and extends forwardly through a notch in the bracket 17 to which it is welded. Each bracket 21 terminates forwardly of the bracket 17 in a downwardly offset portion 21a which rests on the pan 10 within the depression 11 and provides a support for the pivot mounting of one of each of the legs 16 as described below. A lower portion 22a of the reinforcement 22 underlies the depression 11 and terminates rearwardly in an upwardly offset portion which supports the floating nut 24 and is drawn tightly toward the under side of the pan 10 upon tightening of screw 23.

Extending transversely of the body within each depression 11 is a horizontal torsion bar or rod 25 of square section. The left end of the bar 25 in Fig. 3 extends snugly through and is splined within the square bore of a generally cylindrical cam spool 26 having oppositely directed integral bushing extensions 27 and 28 coaxial with the rod 25. The outer surfaces of the bushings 27 and 28 are cylindrical and comprise pivotal bearing supports for the left or pivotal end of the rod 25 as described below.

As indicated in Fig. 1, the left bracket arm 17a is provided adjacent its rear end with an upwardly opening rectangular notch 29 for an upper yoke or block 30. Welded to the inner portion of the arm 17a at the region of the notch 29 is a reinforcement 31, Fig. 3, the juxtaposed portions of the bracket arm 17a and reinforcement 31 being provided with a horizontal upwardly opening trough having a cylindrical bottom portion coaxial with the cylindrical hub 28 and supporting the latter therein. Similarly, the yoke 30 is provided with a downwardly opening trough mating with the trough in the portions 17a and 31 to complete a cylindrical journal support for the hub 28. The yoke 30 is secured in position overlying the hub 28 and bracket portions 17a and 31 by a pair of screws 32.

Figure 3:
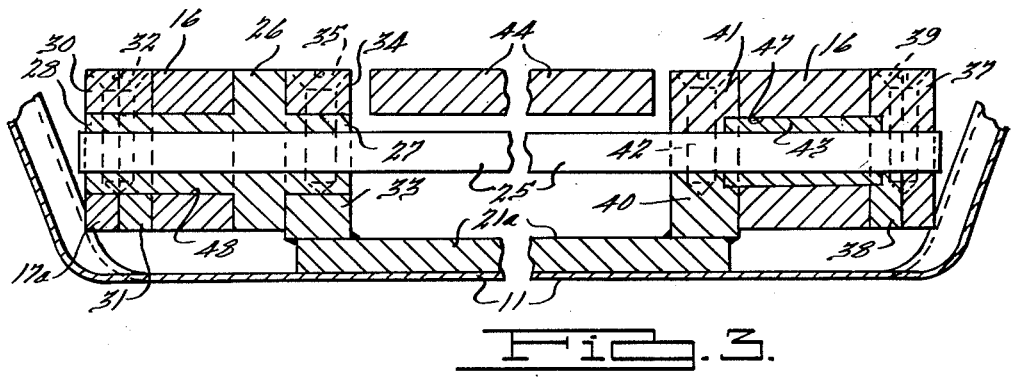
Fig. 3 is a fragmentary vertical section longitudinally of the torsion bar, taken in the direction of the arrows substantially along the line 3—3 of Fig. 2.

The journal support for the hub 27 includes a block 33 welded to the bracket 21a, Fig. 3, and provided with an upwardly opening channel having a cylindrical bottom portion coaxial with the hub 27 and supporting the latter therein, Fig. 8. Overlying the block 33 and bushing 27 is a yoke or block 34 secured to the block 33 by a pair of screws 35 having a downwardly opening cylindrical trough mating with the trough in the block 33 to complete a cylindrical journal support for the hub 27.

At the right in Fig. 3, the arm 17a is provided with a notch 36 for a yoke 37. Welded to the inner side of the bracket arm 17a adjacent the notch 36 is a reinforcing block 38, Fig. 3. The right end of the rod 25 extends snugly through a transverse square opening in the bracket members 17a and 38 and is thus keyed against rotational movement. The yoke 37 closely overlies the upper portion of the rod 25 and is secured to the brackets 17a and 38 by a pair of screws 39, Figs. 2 and 3.

Spaced axially from the block 38 is a similar block 40 welded to the upper portion of the bracket 21a at the right in Fig. 3. A mating block or yoke 41 closely overlies the rod 25 and block 40 and is secured to the latter by a pair of screws 42, Fig. 7. The rod 25 extends snugly through a square notch in the upper portion of block 40 and is thus held against torsional movement with respect thereto. Sleeved coaxially around the shaft 25 between the yokes 37 and 41 is a bushing 43 having an outer cylindrical surface and a square bore through which the rod 25 snugly passes, Fig. 6. As indicated in Fig. 3, the bushing 43 is recessed axially into the mating blocks 40 and 41 at one end and into the mating blocks 37 and 38 at the other end.

By the structure thus far described, the rod 25 is rigidly held against rotation with respect to the vehicle body at its right end and is keyed to a pivotal spool 26 whereby it is rotatably supported at its left end for twisting or pivotal movement about its principal axis upon the application of torsional force thereto.

Figure 2:
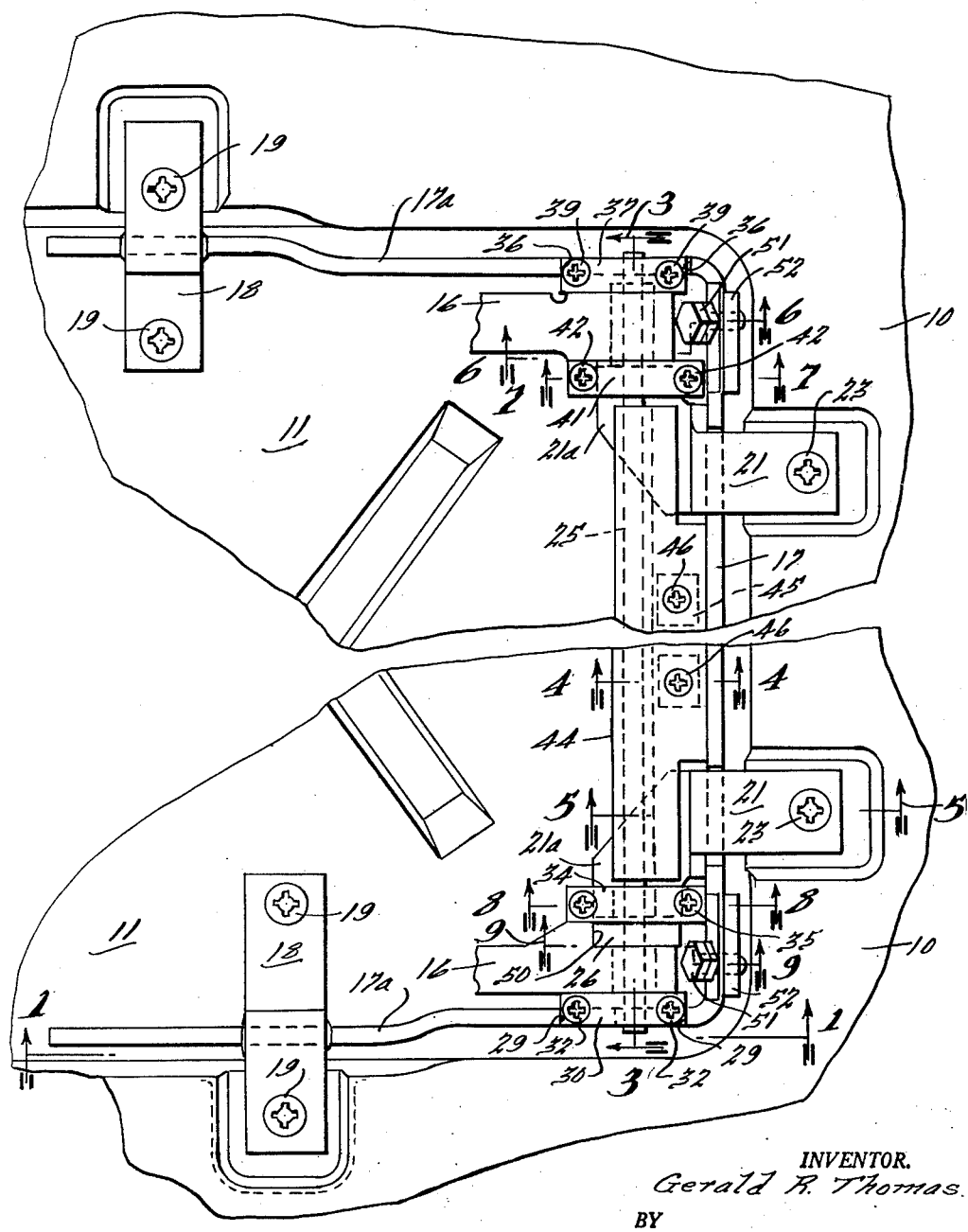
Fig. 2 is a fragmentary enlarged plan view taken in the direction of the arrows substantially along the line 2—2 of Fig. 1.
Figure 4:
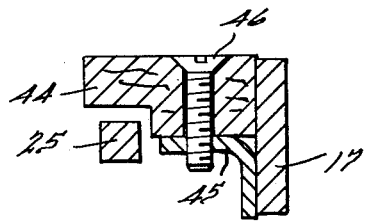
Fig. 4 is a cross-sectional view through the torsion bar and shield, taken in the direction of the arrows substantially along the line 4—4 of Fig. 2.

Intermediate the blocks 41 and 34 and overlying the torsion bar 25 is a shield 44 having a rearward portion secured to a pair of angle brackets 45 by screws 46, Figs. 2 and 4. The bracket 45 in turn is suitably secured to the forward edge of the bracket 17 as for example by being welded thereto.

The right and left legs 16 of the auxiliary seat are provided at their lower ends with transverse bores 47 and 48 respectively through which the bushings 43 and 28 extend coaxially, whereby the legs 16 are pivotal forwardly to the folded position of Fig. 1 or rearwardly to the raised position, phantom view. As illustrated in Figs. 9 and 10, the spool 26 is provided with a flat boss or cam surface 49 arranged in a plane inclined rearwardly at approximately 45° when the legs 16 are at the raised position and the rod 25 is untensed. Immediately overlying the body 26 is a pawl or driving member 50 integral with the left leg 16 and having a flat bottom surface adapted to abut the surface 49 in parallelism therewith upon forward swinging of the legs 16 to a partially folded condition, Fig. 10. Thereafter, upon continued forward swinging of the legs 16, the boss 49 is engaged by the pawl 50 which turns the spool 26 counterclockwise in Figs. 9 and 10, thereby twisting the left end of the torsion bar 25 splined in the spool 26 and effecting a counterbalancing action for the weight of the auxiliary seat structure.

By virtue of the foregoing construction, the legs 16 have a free swinging movement of approximately 45° from the vertical position before the counterbalancing means, including the torsion rod 25 and cam 26 keyed thereon, becomes effective. Accordingly, no spring tension resists the initial folding movement from the position of Fig. 1 whereat the center of gravity of the seat 12 and back 14 is rearward of the axis of the rod 25. As the legs 16 swing forward to the position of Fig. 10, the center of gravity also swings forwardly of the hinge axis and the counterbalancing action of the torsion rod 25 also becomes effective. Thereafter, the weight of the seat 12 and back 14 assisting downward movement becomes more effective and the counterbalancing action of the torsion rod 25 also increases in effectiveness upon continued downward swinging of the legs 16 to their lowermost position, Fig. 1.

Rearward swinging of the legs 16 is limited by suitable movement limiting means when the seat is at the desired unfolded position. As shown in Figs. 2 and 9, immediately rearward of the lower end of each leg 16, a movement limiting bolt 51 screws rearwardly through the bracket 17 and a reinforcement 52 welded to the rear of the bracket 17. By suitably adjusting the position of the bolts 51, their forward ends abut stops 53 integral with the lower ends of the legs 16 to limit backward tilting of the auxiliary seat structure at the desired unfolded position.

I claim:

1. In a foldable auxiliary seat structure for an automobile body, a seat, vertically swinging leg means having a swinging end secured to said seat to swing the same between raised and lowered positions and having a pivoted end pivotally secured to said body, and torsional spring means including a rod extending transversely of said seat and having a cam element attached to one end, the other end being keyed to a fixed portion of the body, said leg means having a pawl element engageable with said cam element at a predetermined position intermediate the raised and lowered positions to swing the cam element and said one end of said rod against the tension in the latter upon downward swinging of the leg means from said intermediate position.

2. In a foldable auxiliary seat structure for an automobile body, a seat, torsional spring means including a torsion rod extending transversely of said seat and having a fixed end secured to a fixed portion of said body, said torsional spring means also including a cam element attached to the other end of said rod, vertically swinging leg means having a swinging end secured to said seat to swing the same between raised and lowered positions and having a pivoted end pivotally mounted on said torsion rod, said leg means having a pawl element engageable with said cam element at a predetermined position intermediate the raised and lowered positions to swing the cam element and thereby twist said other end of said rod against the tension thereof upon downward swinging of said leg means from said intermediate position.

3. In a foldable auxiliary seat structure for an automobile body, a seat, torsional spring means extending transversely of said seat and having a fixed end secured to said body and also having a pivotal end, leg means pivotally mounted on said torsional spring means and connected to said seat to swing the same to and from a lowered position, means on said torsional spring means adjacent the pivotal end thereof and attached thereto and adapted to be engaged by a portion on said leg means to twist said pivotal end upon downward swinging of said leg means to its lowered position.

4. In a foldable auxiliary seat structure for an automobile body, a seat, torsional spring means including a torsion rod extending transversely of said seat and having a fixed end secured to said body and also having a pivotal end, leg means pivotally mounted coaxially on said torsion rod adjacent said ends thereof and connected to said seat to swing the same to and from a lowered position, means attached to said torsion rod adjacent the pivotal end thereof and adapted to be engaged by a portion on the adjacent leg member to twist said pivotal end upon downward swinging of said adjacent leg member to its lowered position.

5. In a hinge structure for a vertically swinging auxiliary seat adapted to be swung forwardly and downwardly through a predetermined arc from an upright position to a folded position within an automobile body structure, a horizontal torsion rod extending transversely of said seat and having a fixed end secured to fixed bracket means of said body and also having a pivotal end, a bushing mounted coaxially on the rod adjacent said fixed end, a second bushing attached coaxially on said rod in supporting relation adjacent said pivotal end and rotatably mounted on a second fixed bracket means of said body, a pair of swinging legs pivotally mounted coaxially on said bushings respectively and having swinging ends secured to said seat to swing the same to and from the folded position, a pawl element on the leg which is pivoted on said second bushing, said second bushing having a cam portion extending into the path of swinging movement of said pawl element at approximately the mid-region of said arc to be swung by engagement with said pawl element, thereby to twist the pivotal end of said rod and tension the same upon swinging of said seat to the folded position.

6. In a foldable seat structure for a vehicle body, a seat, swingable leg means secured to the seat and depending therefrom, torsional spring means, means for pivotally supporting the lower end of said leg means independently of said spring means, and means movable with said leg means during predetermined swinging motion thereof and engageable with a part on said spring means for torsionally and angularly deflecting said spring means.

7. In a foldable seat structure for a vehicle body, a seat, means for supporting the seat including a leg depending therefrom, a spring torsion bar having a fixed end portion and a rotatable portion adapted to be torsionally deflected angularly, means for pivotally mounting the lower end of said leg independently of said rotatable portion, and cooperating members on said leg and rotatable portion and engageable during predetermined swinging motion of the leg for torsionally deflecting said torsion bar.

8. In a foldable seat structure for a vehicle body, a seat, means for supporting the seat including a leg depending therefrom, a spring torsion bar having a fixed end portion and a rotatable portion adapted to be torsionally deflected angularly, means for pivotally mounting the lower end of said leg to provide for swinging motion of the leg relatively to said rotatable portion of the torsion bar during an initial portion of the range of folding movement of the seat, and cooperating means on said leg and rotatable portion of the torsion bar engageable during a further portion of the range of folding movement of the seat for torsionally deflecting angularly said torsion bar.

References Cited in the file of this patent

UNITED STATES PATENTS

| 518,639 | Wilson | Apr. 24, 1894 |
| 1,268,800 | Adelsperger et al. | June 4, 1918 |

FOREIGN PATENTS

| 612,475 | Great Britain | Nov. 12, 1948 |